July 6, 1926.
W. W. BROWN
1,591,415
ELECTRICAL REVERSING MECHANISM
Filed Dec. 10, 1924
5 Sheets-Sheet 1
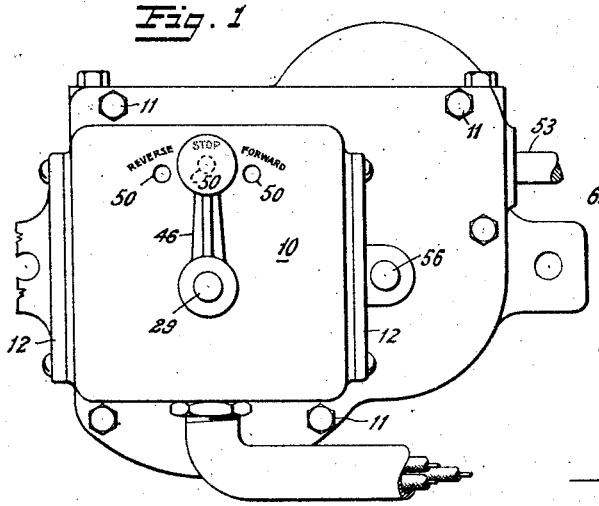
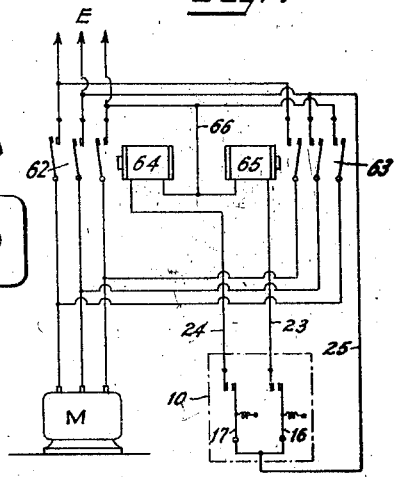
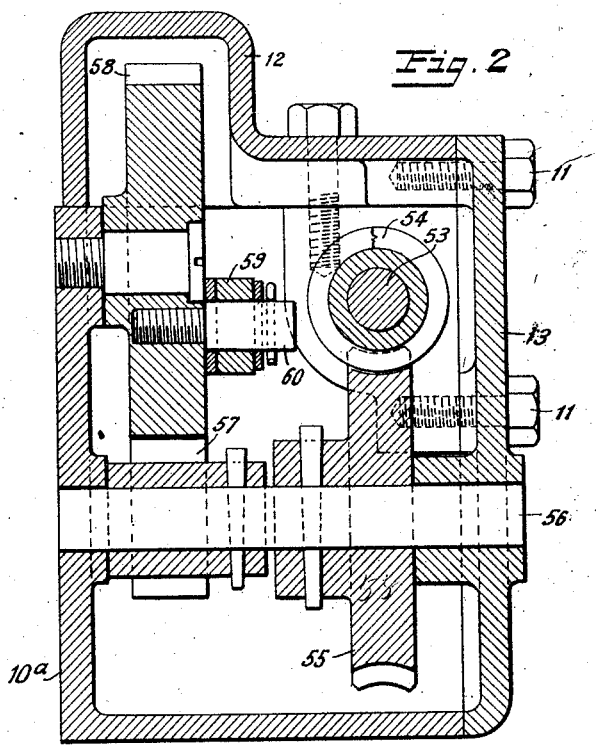
INVENTOR
William W. Brown
BY
Duell Anderson & Duell
ATTORNEYS

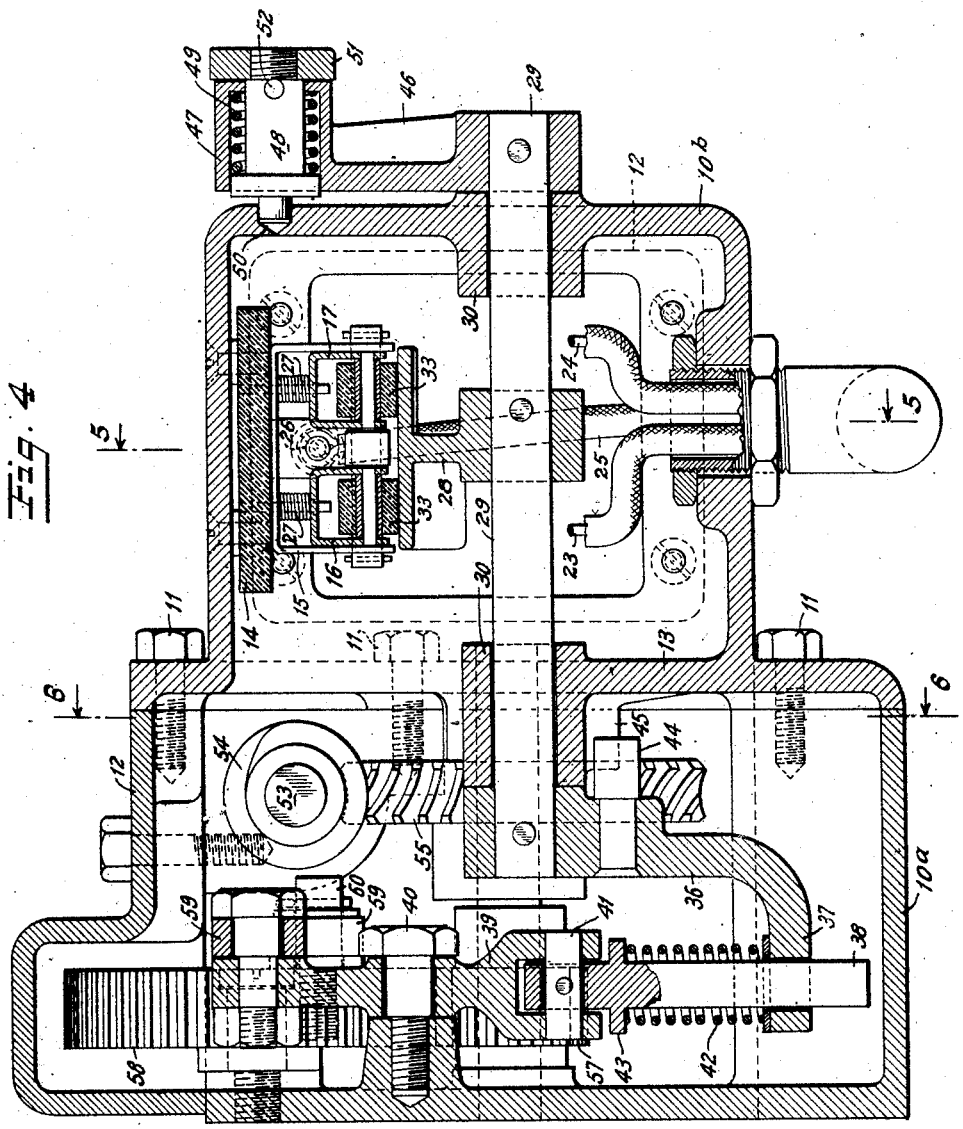

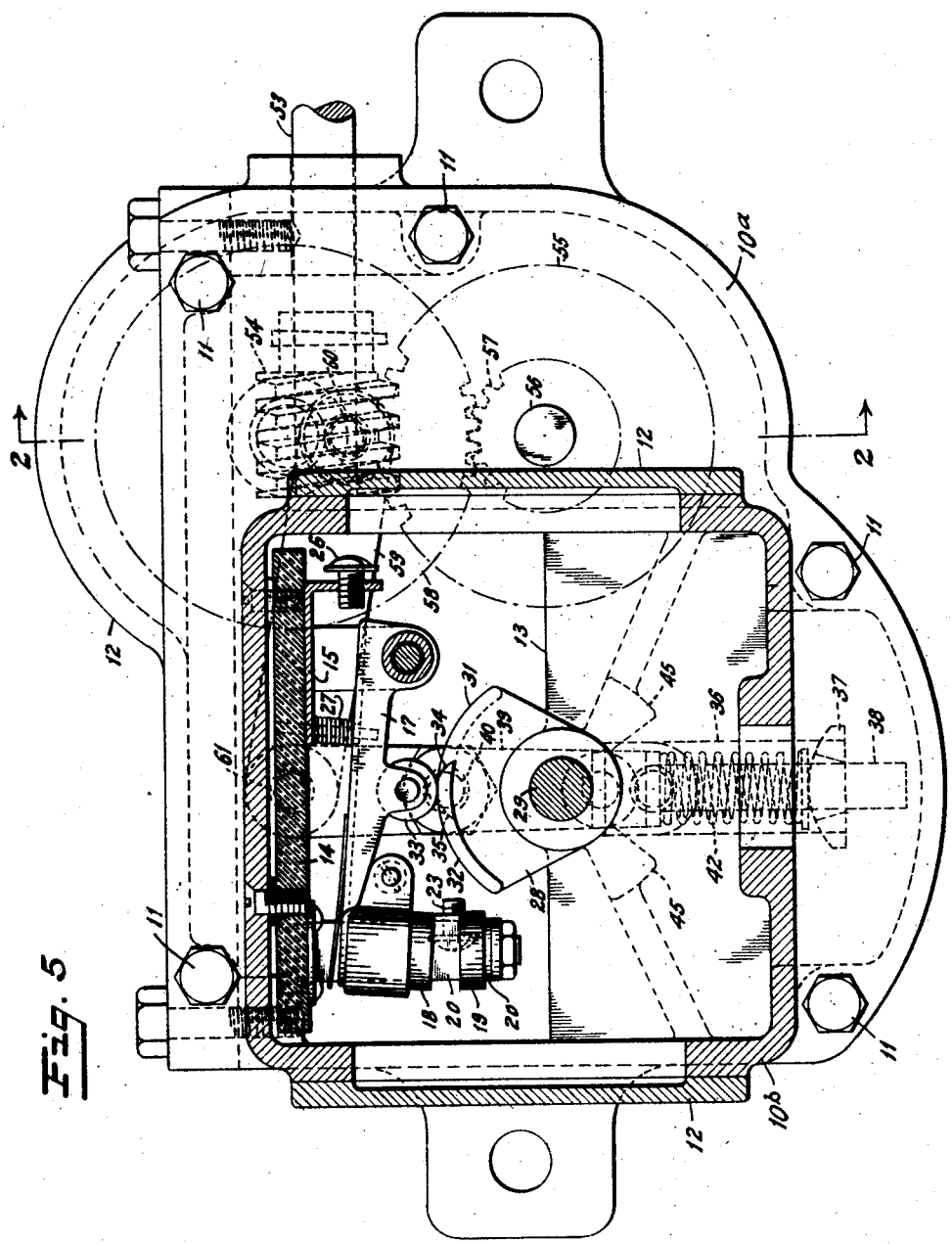

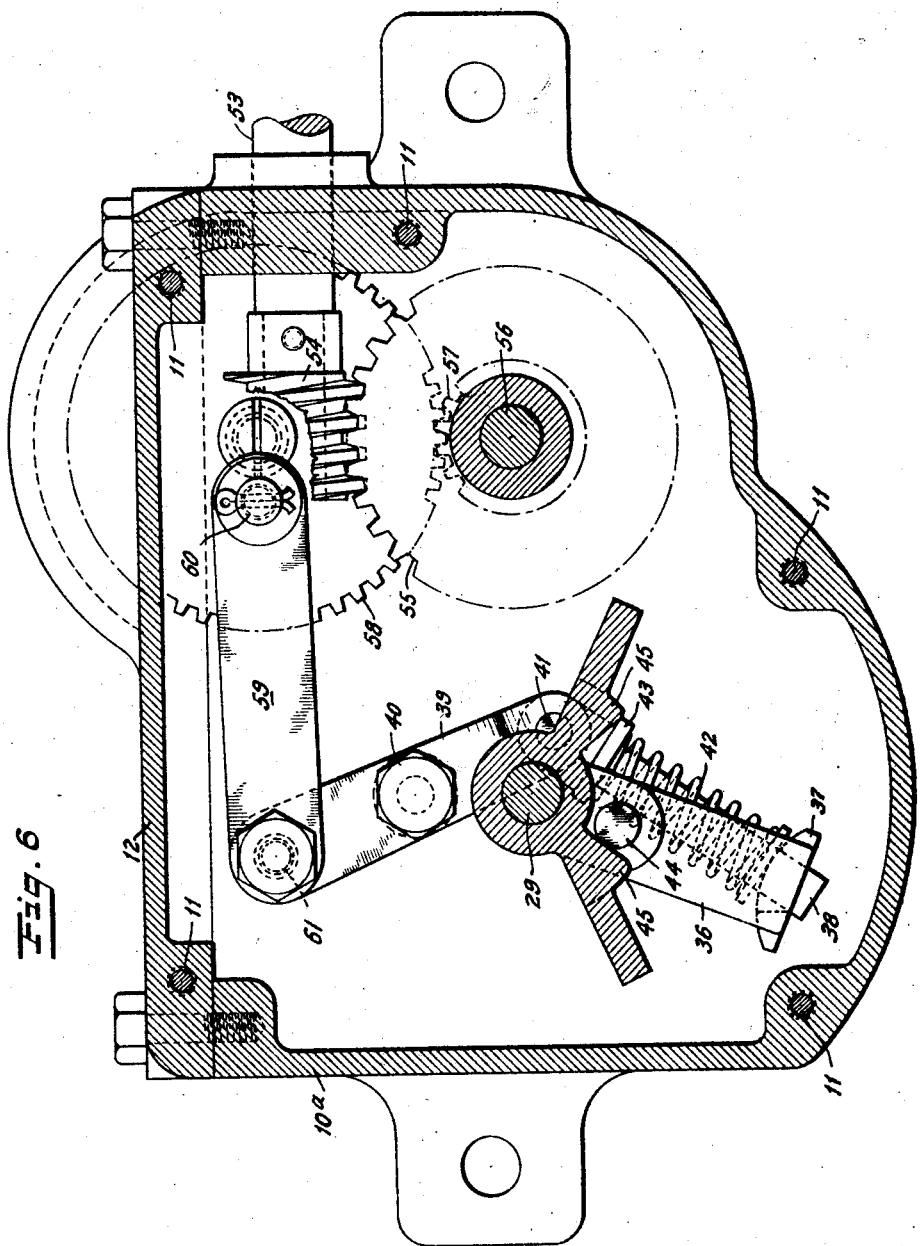

Patented July 6, 1926.

1,591,415

UNITED STATES PATENT OFFICE.

WILLIAM WARNER BROWN, OF OAK LANE, PENNSYLVANIA, ASSIGNOR, BY MESNE ASSIGNMENTS, TO H. W. BUTTERWORTH & SONS COMPANY, A CORPORATION OF PENNSYLVANIA.

ELECTRICAL REVERSING MECHANISM.

Application filed December 10, 1924. Serial No. 754,919.

This invention relates to improvements in contact controlling mechanism, which, in some of its aspects, is adapted more particularly for automatic control of motor circuits so as to intermittently reverse the direction of motor rotation or to maintain rotation constant in a given direction.

The general object contemplated by the invention is the provision of an improved reversing mechanism for motors in various applications of machine drive, and which embodies structural and operative features of advantage.

It is a further object of the invention to provide an improved motor reversing mechanism which is unitary in construction and may be advantageously and easily installed.

Another object is to provide an improved motor controlling switch mechanism of the class mentioned which may, by a simple adjustment, be set to operate the motor continuously in one direction or another, or to automatically reverse it at predetermined intervals.

A further object is to provide an improved motor controlling switch mechanism of the class mentioned, connected for operation by the motor and which precludes or reduces to a minimum the possibility of permanently opening the motor circuit during reversal of the connections.

Other objects will be in part obvious in connection with the following detailed description of an illustrative but preferred embodiment of the invention and will be in part pointed out therein.

The invention accordingly comprises the features of construction, combinations of elements, and arrangement of parts, which will be exemplified in the constructions hereinafter set forth and the scope of the application of which will be indicated in the claims.

For a more complete understanding of the nature and objects of the invention, reference is had to the following detailed description and to the accompanying drawings, in which:

Figure 1 is a front elevation of a reversing mechanism constructed in accordance with the invention;

Fig. 2 is an enlarged sectional view taken approximately on the line 2—2 of Figs. 3 and 5, looking in the direction of the arrows;

Fig. 4 is a vertical section taken approximately on the line 4—4 of Fig. 3, looking in the direction of the arrows;

Fig. 5 is a section on the line 5—5 of Fig. 4;

Fig. 6 is a section on the line 6—6 of Fig. 4; and

Fig. 7 is a simplified diagram of connections showing the application of the invention to automatically reverse an electric motor.

Figure 3:
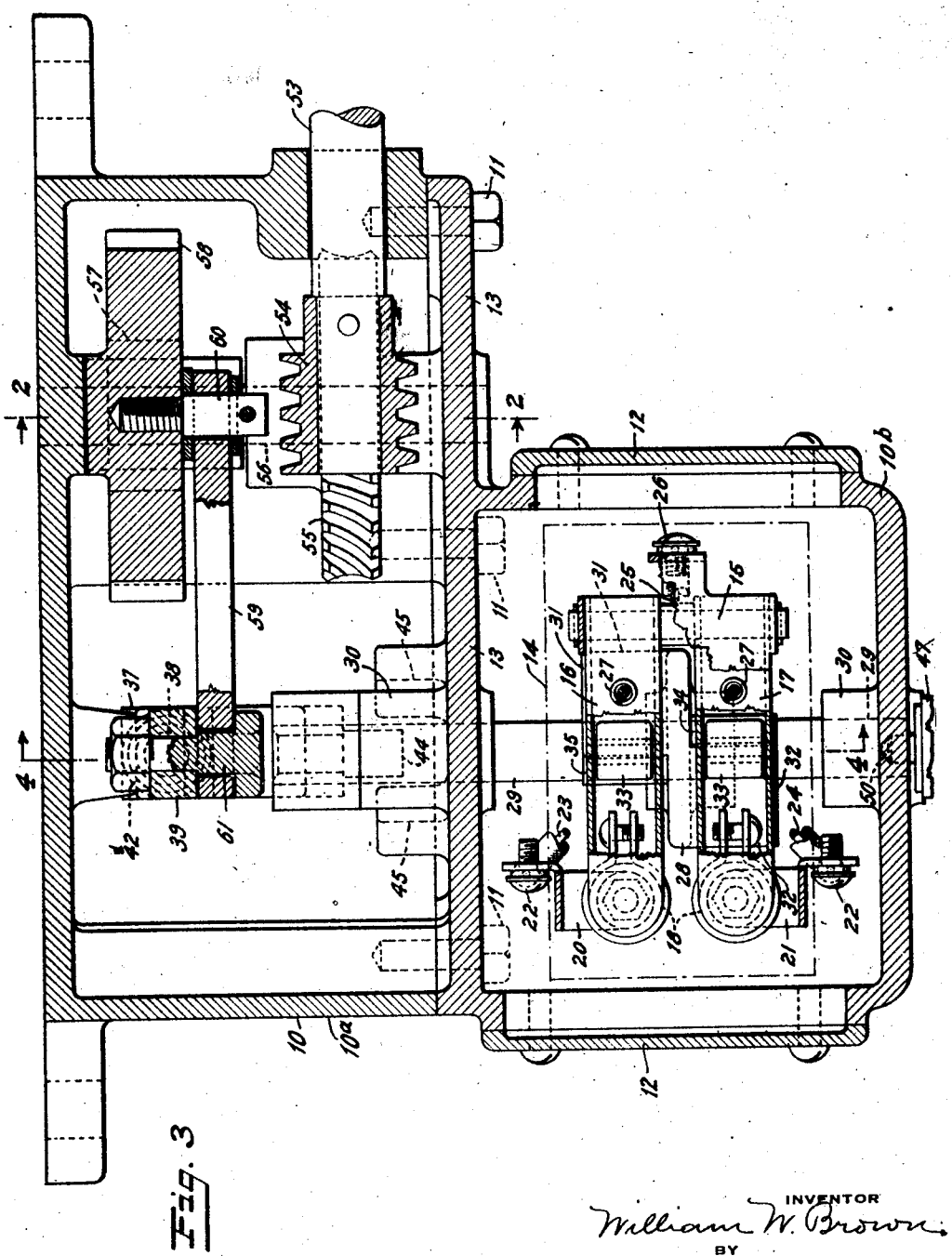
Fig. 3 is a horizontal section through the casing, showing the operating switch and operating mechanism therefor in plan, certain parts being broken away and shown in section to facilitate disclosure.

Referring to the drawing for a detailed description of the embodiment of the invention there shown, the casing or housing 10 for the operating parts of the reversing mechanism may be of cast metal being preferably constructed in sections $10^a$, $10^b$, secured together by machine screws 11, the casing also being provided with removable cover plates 12 for the purpose of providing convenient access to the operative elements within. The switches for controlling the electric circuits are mounted on the section $10^b$, while the operating and control mechanism for these switches is mounted in the casing section $10^a$. The base section $10^a$ is somewhat broader than the section $10^b$ (see Figs. 3, 4 and 5), the dividing plate 13 between the two sections being preferably an integral part of the section $10^b$, parts of which extend beyond the walls of the plate section to provide for convenient attachment to the other section. The plate 13 thus forms a removable cover for the interior compartment of the base section $10^a$, the operating mechanism carried by each section being conveniently separable and adapted for convenient assembly with the switching mechanism of section $10^b$, operatively coupled with the switch operating mechanism of the section $10^a$.

Referring particularly to Figs. 3, 4 and 5, it will be seen that an insulating switch base 14 is secured to the upper wall of the section $10^b$, and pivoted to a metallic plate 15 attached to this base are two movable switch members 16 and 17, each carrying a contact block 18, opposing a similar contact block 19 each of which is mounted in a separate supporting plate 20 or 21, carrying binding screws 22 to which the electric conductors 23 and 24 are connected. A third conductor 25 is connected to the metallic plate 15 or to an extension thereof by a binding screw 26.

The switch members 16 and 17 are biased toward contact closing position by compression springs 27 mounted between the respective switch and the supporting plate 15. The switch members are operated to open or close the contacts by means of a cam 28 mounted on a rotary shaft 29 carried in bearings 30 preferably formed integrally with the casing section 10ᵇ. This cam has adjacent cam faces, 31, 32 disposed to contact with rollers 33 mounted on the under sides of the switch members 16 and 17.

As shown in Fig. 5, the cam face 32 has an eccentric lobe 34, the face 32 being generally concentric with the center of rotation of the cam. The cam face 31 is also provided with a lobe 35 similar to the lobe 34 but reversedly arranged as shown in dotted lines in Fig. 5. The cam faces are spaced apart to contact respectively with the rollers 33 and have lapping parts adjacent the lobes 34, 35 so as to support both the switch members in open position when the cam is in middle position. Upon movement of the shaft 29 in either direction one of the cam rollers 33 rides over the corresponding cam lobe 34 or 35 permitting the corresponding switch member to close its contacts under the influence of spring 27.

Operation of the cam 28 is effected by mechanism for rotating the shaft 29 in either direction with a snap action, this mechanism being controlled by the controlled motor or by mechanism driven thereby. This cam operating mechanism, as shown to best advantage in Figs. 4 and 6, includes a shifter arm 36 fixed to the shaft 29 and having an angularly disposed extension 37 with an opening therein for loosely receiving in slidable relation a booster finger 38 forming the lower link of an actuating toggle, the other link of the toggle being formed by a link or lever 39 pivotally mounted on a bearing screw 40 and pivotally connected to the lower link or booster finger 38 at 41. A compression booster spring 42 is confined between a stationary lug or collar 43 on the link 38 and the inner surface of the shifter arm extension 37.

A stop lug 44 is fixed on the shifter arm 36 lying in position to cooperate with spaced lugs 45 to stop the shifter arm in either one of its two limiting positions. The lugs 45, as shown, may be conveniently formed integrally with the casing 10ᵇ.

The outer end of shaft 29 (see Figs. 1 and 4) lies externally of the cap casing 10ᵇ and fixed thereto is an operating crank 46 having a handle 47 fitted with a locking pin 48 urged forwardly by a spring 49 so the locking extremity thereof will engage in any one of a plurality of locking recesses 50. The outer end of the locking pin is provided with a knob 51 which may be grasped by the hand to retract the pin against the resistance of the spring, and the pin may be held in retracted position by means of a lug 52 thereon. The locking pin may be turned on its axis by means of the knob 51 so the lug 52 will come into contact with the outer rim of the handle 47, it being understood that a slot or depression is provided in the rim of the handle to permit projection of the pin into locking position.

As above suggested, the switch actuating mechanism described is preferably controlled by the controlled motor for the machine or mechanism driven thereby, this being accomplished in the embodiment disclosed as shown to best advantage in Figs. 2, 3, 4, 5 and 6, by means of a shaft 53 which will be operatively coupled with the motor or driven machine. A worm 54 on the shaft 53 meshes with a worm wheel 55 fixed to a shaft 56 mounted in the casing to which is also fixed a pinion 57 meshing with a toothed crank gear 58 mounted on a stub attached to the casing. A pitman 59 is connected at one end to an eccentric pin 60 on the crank gear, its opposite end being connected by a pin 61 to an extension of the toggle lever 39.

The simplified diagram of Fig. 7 shows connections for controlling a motor M through an electro-magnetically controlled reversing switch which may be of any preferred standard or known construction. In the arrangement of the reversing switch as shown, the power supply line E is connected to a three pole switch 62 and also to a similar three pole switch 63, there being a set of leads from each of these switches to the motor M, one set being connected to operate the motor in one direction and the other set being connected to operate the motor in reverse direction. An electro-magnet 64 is provided for controlling the switch 62 and a similar magnet 65 is arranged to control the switch 63. Switch 62 is closed when its magnet is energized and opened upon de-energization thereof, and the magnet 65 similarly controls switch 63. This electro-magnetic switch as just outlined, is disclosed to illustrate the application and operation of the present invention to effect reversal of a motor.

The casing 10 is indicated in the dot and dash outline in Fig. 7, the conductor 23 extending from the switch 16 to the magnet 65 and the conductor 24 extending from the switch 17 to magnet 64. Conductor 25 extends to one side of the line and a common return 66 for the magnet circuit extends to the other side of the line.

The operation of the invention will now be understood and may be summarized as follows:

Assuming the control handle to be in stop position as shown in Fig. 1, the shifter arm 36 will be in mid position as shown in dotted lines in Fig. 5 and switches 16 and 17 will be held open by the cam 28, switches 62 and 63 consequently being open. The position of the actuating toggle 38, 39 is arbitrarily selected in Fig. 5, and it will be understood that it may be in some other position of the pitman 59. If it is desired to start operation of the motor to automatically reverse at intervals, the lock pin 48 is retracted and turned on its axis through part of a revolution to hold it permanently out of locking engagement with the recesses 50, and the operating arm 46 is moved, say to "forward" position. This closes one of the switches 16 and 17 through the cam 28, energizing the corresponding magnet 64 or 65 and the motor starts forward rotation. The shifter arm 36 will now be in the position corresponding to that shown in Fig. 6, but the actuating toggle 38, 39 may be in this or in some other position depending upon the position of the crank gear 58 and pitman 59.

Assuming the actuating toggle to be in the position shown in Fig. 6, starting of the motor effects movement thereof, through the shaft 53, pitman 59 and intermediate connections, to move the lever 39 on its axis, thus compressing the booster spring 42. When the actuating toggle passes beyond the position indicated in dotted lines in Fig. 5, nearly to the end of its stroke in this direction, the spring will be fully compressed, the pivot supports of the toggle levers then assuming a straight line disposed somewhat beyond the point of contact between stop lugs 44 and 45. Under these conditions, the booster spring asserts a force on the shifter arm 36 moving it instantaneously from the position shown in Fig. 6 to the opposite position where the lug 44 contacts with the opposed stop lug 45. This snap movement actuates the cam 28 through shaft 29 to reverse the switches 16, 17, changing the connections of electro-magnetic switch 62, 63 and thus reversing operation of the motor. Upon rotation of the motor in reverse direction, the cycle of operations just described will be repeated but in reverse order to again effect reversal of the motor, the actuating arm 36 thus oscillating within angular limits fixed by lugs 45, correspondingly oscillating cam 28 and operating crank 46.

If it is desired to operate the motor continuously in either direction, the operating crank 46 is set and locked in "reverse" or "forward" position shown in Fig. 1 and one of the switches 16 or 17 will be held permanently closed while the other is held permanently open. Continuous operation of the motor will then oscillate the actuating toggle idly from one extreme position to another without changing the position of the shifter arm 36.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a controlling mechanism for electric motors, in combination, contact mechanism for automatically controlling the motor power supply circuit to repeatedly reverse the motor, and means for locking said contact mechanism in position for continuous operation of the motor in either direction.

2. In a controlling mechanism for electric motors, in combination, contact mechanism for automatically controlling the motor power supply circuit to reverse the motor, means for locking said contact mechanism in position for continuous operation of the motor in either direction, and driving means for the contact mechanism operated by the motor.

3. In a controlling mechanism for electric motors, in combination, contact mechanism for automatically controlling the motor power supply circuit to repeatedly reverse the motor, means for locking said contact mechanism in position for continuous operation of the motor in either direction, and means to maintain said contact mechanism in an intermediate position to open the power circuit to the motor.

4. In a controlling mechanism for electric motors, in combination, contact mechanism for automatically controlling the motor power supply circuit to reverse the motor, means for locking said contact mechanism in position for continuous operation of the motor in either direction, means to maintain said contact mechanism in an intermediate position to open the power circuit to the motor, and motor operated driving means for the contact mechanism.

5. In a controlling mechanism for electric motors, in combination, contact mechanism for controlling the motor power supply circuit to operate the motor in either direction, an oscillatable shifter arm operatively connected to said contact mechanism, a booster finger connected to exert a resilient thrust upon said shifter arm and means to change the direction of said thrust upon said shifter arm to operate said arm in opposite directions.

6. In a controlling mechanism for electric motors, in combination, contact mechanism for controlling the motor power supply circuit to operate the motor in either direction, a shaft operatively connected to said contact mechanism, means connected to said shaft to operate the same for automatic reversal of the motor connections and manual means connected to operate said shaft and to lock it in position to maintain said contact mechanism in position to operate the motor continuously in either direction.

7. In a controlling mechanism for electric motors, in combination, contact mechanism for controlling the motor power supply circuit to operate the motor in either direction, mechanism including a cam with reversely arranged cam faces for operating said contact mechanism to reverse the motor at predetermined intervals, and motor operated mechanism for operating said cam with a snap action in reverse directions.

8. In a controlling mechanism for electric motors, in combination, contact mechanism for controlling the motor power supply circuit to operate the motor in either direction, cam mechanism for controlling said contact mechanism, an oscillatable shaft connected to said cam mechanism and a power mechanism for operating said shaft with a quick action in either direction.

9. In a controlling mechanism for electric motors, in combination, contact mechanism for controlling the motor power supply circuit, mechanism including a snap action for operating said contact mechanism to reverse the motor at predetermined intervals, a continuously oscillating arm operated by the motor for setting said contact operating mechanism for snap operation in either direction, and means for continuing the motor connections in position to operate the motor continuously in either direction while said arm continues its oscillation.

10. In a controlling mechanism for electric motors, in combination, contact mechanism for controlling the motor power supply circuit, an oscillatable shifter arm, means for oscillating said shifter arm to control said contact mechanism, and means for holding said shifter arm in position for continuous operation of the motor in either direction while the operating means for said shifter arm continues operation.

11. In a controlling mechanism for electric motors, in combination, contact mechanism for controlling the motor power supply circuit, an oscillatable shifter arm for holding said contact mechanism in positions to operate the motor in different directions when said shifter arm is in different positions, and a toggle mechanism for operating said shifter arm.

12. In a controlling mechanism for electric motors, in combination, contact mechanism for controlling the motor power supply circuit, an oscillatable shifter arm for holding said contact mechanism in positions to operate the motor in different directions when said shifter arm is in different positions, and a booster finger for suddenly operating said shifter arm in opposite directions.

13. In a controlling mechanism for electric motors, in combination, contact mechanism for controlling the motor power supply circuit, an oscillatable shifter arm for holding said contact mechanism in positions to operate the motor in different directions when said shifter arm is in different positions, a booster finger for suddenly operating said shifter arm in opposite directions, and an oscillatable arm connected to said booster finger and connected for continuous oscillation by the motor.

14. In a controlling mechanism for electric motors, in combination, contact mechanism for controlling the motor power supply circuit, an oscillatable shifter arm for holding said contact mechanism in positions to operate the motor in different directions, an oscillatable arm connected for continuous operation by the motor, a booster finger pivoted to said oscillatable arm, and a yielding connection between said booster finger and said shifter arm for effecting movement of the latter in either direction.

15. In a controller for electric motors, in combination, contact mechanism for controlling the motor power supply circuit to operate the motor in either direction, cam mechanism for controlling said contact mechanism, an oscillatable shaft connected to said cam mechanism, a toggle operatively connected to said shaft and connections to flex said toggle in opposite directions to correspondingly operate said shaft and change the motor supply connections.

16. In a controller for electric motors, in combination, contact mechanism for controlling the motor power supply circuit to operate the motor in either direction, cam mechanism for controlling said contact mechanism, an oscillatable shaft connected to said cam mechanism, a toggle flexibly connected to said shaft, connections to flex said toggle in opposite directions to correspondingly operate said shaft and change the motor supply connections, and locking means for locking said shaft in positions to maintain said contact mechanism in position for continuous forward or reverse motor operation or to maintain the motor circuit open.

17. In a controller for electric motors, in combination, contact mechanism for controlling the motor power supply circuit to operate the motor in either direction, cam mechanism for controlling said contact mechanism, an oscillatable shaft connected to said cam mechanism, a shifter arm connected to said shaft, a toggle having one link thereof flexibly connected to said shifter arm and means for flexing said toggle in opposite directions to correspondingly operate said shaft with a quick action.

18. In a controller for electric motors, in combination, switch mechanism for controlling the motor power supply circuit, a power mechanism for operating said switch mechanism to reverse the motor, means operated by the motor for energizing said power mechanism, and means for locking said power mechanism to operate the motor continuously in either direction.

19. In a controller for electric motors, in combination, switch mechanism for controlling the motor power supply circuit, a power mechanism for operating said switch mechanism to reverse the motor, said power mechanism including an oscillatable member and a spring cooperating therewith, and means operated by the motor for energizing said spring to operate said oscillatable member with a quick action in either direction.

20. In a controller for electric motors, in combination, switch mechanism for controlling the motor power supply circuit, means for moving said switch mechanism from one position to another to change the motor connections, means operated by the motor to initiate operation of said switch moving means, said switch moving means being effective upon initiation of its operation to move the switch to change the motor connections irrespective of further control thereof by the motor.

21. In a controller for electric motors, in combination, contact mechanism for controlling the motor power supply circuit to operate the motor in either direction, cam mechanism for controlling said contact mechanism, an oscillatable shaft connected to said shaft, a toggle having one link thereof loosely extending through an opening in said shifter arm, means for flexing said toggle in opposite directions, and a spring between said shifter arm and said toggle link, said spring being stressed as the toggle is flexed and becoming effective when the toggle reaches a predetermined position to operate said shaft with a quick action.

22. In a controller for electric motors, in combination, contact mechanism for controlling the motor power supply circuit, operating mechanism for said contact mechanism for automatic operation thereof to reverse the motor, a casing having a plurality of sections, said operating mechanism being supported and housed by one of said sections, and another of said sections supporting and housing said contact mechanism and detachably secured to and forming a cover for the other section.

23. In a controlling mechanism for electric motors, in combination, electromagnetically controlled switch mechanism, contact mechanism for controlling the motor supply circuit through said electromagnetically controlled switch mechanism, and means for controlling said contact mechanism to operate the motor continuously in either direction or to automatically repeatedly reverse the motor at intervals.

24. In a controlling mechanism for electric motors, in combination, electromagnetically controlled switch mechanism, contact mechanism for controlling the motor supply circuit through said electromagnetically controlled switch mechanism, and means for controlling said contact mechanism to automatically repeatedly reverse the motor at intervals, said contact controlling means including an oscillatable booster arm, and a spring adapted to be placed under stress by oscillation of said booster arm and being operable at a predetermined point in the oscillatory movement of said arm to operate the contact mechanism with a quick snap action.

25. In a controlling mechanism for electric motors, in combination, an electromagnetically controlled switch mechanism, contact mechanism operating with successive quick snap actions for controlling the motor power supply circuit through said switch mechanism, and motor driven means for controlling said contact mechanism to operate the motor continuously in either direction or to automatically repeatedly reverse the motor at intervals.

In testimony whereof I affix my signature.

WILLIAM WARNER BROWN.